United States Patent [19]

Terry et al.

[11] Patent Number: 5,495,600

[45] Date of Patent: Feb. 27, 1996

[54] CONVERSION OF QUERIES TO MONOTONICALLY INCREASING INCREMENTAL FORM TO CONTINUOUSLY QUERY A APPEND ONLY DATABASE

[75] Inventors: Douglas B. Terry, San Carlos; David Goldberg, Palo Alto; David A. Nichols; Brian M. Oki, both of Mountain View, all of Calif.

[73] Assignee: Xerox Corporation, Stamford, Conn.

[21] Appl. No.: 892,869

[22] Filed: Jun. 3, 1992

[51] Int. Cl.$^6$ .................................................. G06F 17/30
[52] U.S. Cl. ....................... 395/600; 364/974.6; 364/974; 364/DIG. 2
[58] Field of Search ...................... 395/600; 364/DIG. 1, 364/DIG. 2, 974.6, 974, 282.1

[56] References Cited

U.S. PATENT DOCUMENTS

| | | | |
|---|---|---|---|
| 4,646,229 | 2/1987 | Boyle | 395/600 |
| 5,093,794 | 3/1992 | Howie et al. | 364/468 |
| 5,347,653 | 9/1994 | Flynn et al. | 395/600 |

OTHER PUBLICATIONS

Elmasri et al., "Partitioning Of True Index For Optical Disks", Eighth International Conference On Data Engineering, pp. 574–583 IEEE Comput. Soc. Press, 2–3 Feb. 1992. Classified Search And Image Retrieval Student Manual For The Automated Patent System (APS), May 7, 1991 U.S. Department of Commerce, pp. 2-15 thru 2-22 8-4, 8-5 A-15-16 USPTO.

Qian et al., "Incremental Recomputation Of Active Relational Expressions", IEEE Transactions On Knowledge And Data-Engineering vol. 3 Iss: 3 pp. 337–341, Sep. 1991.
Ozsoyoglu, G.; Du, K.; swamy, S. G.; Hou, W. "Processing Real-Time, Non-Aggregate Queries with Tme-Constraints in CASE-DB." IEEE. Feb. 2, 1992. Tempe, AZ, U.S.A. pp. 410–417.
Bassiouni, M. A.; Llewellyn, M. "Generalized Logical Operators for Temporal Languages." IEEE. Oct. 9, 1988. Miami, FL, U.S.A. pp. 128–134.
Bassiouni, M.; Llewellyn, M. "On the Definition and Maintenance of Database Views with Time-Varying Domains." Sep. 20, 1989. Orlando, FL, U.S.A. pp. 201–208.

Primary Examiner—Thomas G. Black
Assistant Examiner—Jack M. Choules

[57] ABSTRACT

To produce a continuous query for an append-only database, a client defined query first is converted into its minimal bounding non-decreasing monotone (hereinafter referred to as "monotonic increasing" query. This monotonic query, in turn, is converted into an incremental query, The resulting monotonically increasing incremental query then is installed on the database as a stored procedure that takes two date/time parameters (hereinafter referred to as "time" parameters), one of which ($\tau$) identifies the last time the procedure was executed, and the other of which (t) identifies the current time. All database records are timestamped as of the time that they are entered into the database. Thus, in operation, more or less standard procedure calls periodically invoke each of the stored query procedures, thereby periodically executing the incremental queries over database records that have timestamps spanning successive time slots.

5 Claims, 2 Drawing Sheets

CONVERSION OF QUERIES TO MONOTONICALLY INCREASING INCREMENTAL FORM TO CONTINUOUSLY QUERY A APPEND ONLY DATABASE

FIELD OF THE INVENTION

This invention relates to append-only databases and, more particularly, to an efficient query mechanism for extracting selected information from such a database more or less continuously.

BACKGROUND OF THE INVENTION

As is known, records are added to "append-only" databases as they arrive, and those records thereafter are neither deleted nor modified. Typically, the records are assembled into tables within such a database for indexing the underlying source documents by various values, such as by author, date, keywords, and title for a database of news messages, or by sender, recipient, subject, copy distribution, date, and "in reply to" for a database of mail messages.

"Continuous queries" are issued once to henceforth run "continually" over the database until they are modified or deleted. As will be appreciated, this is a useful class of queries for filtering streams of electronic documents, such as mail messages or news articles, in situations where there is a need or desire to identify documents that are of special interest to particular clients (i.e., particular users and/or particular application programs). Among the challenges that are involved in implementing continuous queries are: avoiding nondeterministic results (i.e., the results returned to the user should be independent of the time and frequency at which the query is executed), minimizing the return of duplicate results, and avoiding inefficiencies in the execution of the query.

As will be evident, the wastefulness of returning duplicate results to the clients can be avoided by having the database system maintain a record of all of the results that have been returned to each client in response to each query, so that the only results that would be subsequently returned to that same client, when the same query is re-executed, would be those that cannot be found in that record. Clearly, however, this solution to the problem inherently is inefficient because a significant part of the computational cost of executing the query is likely to be devoted to the selection of records that are subsequently discarded.

Some active databases, such as the Alert system that is described in V. Schreier et al., "Alert: An Architecture for Transforming a Passive DBMS into an Active DBMS," *Proceedings 17th International Conference on Very Large Databases (VLDB)*, Barcelona, Spain, 1991, pp. 469–478, address the efficiency issue by using triggers to execute queries over new data as it arrives. However, there still is a need for an efficient and reliable technique for implementing more or less arbitrary continuous queries in standard SQL (Standard Query Language) because that is the query language of choice for many existing relational databases. Flexibility in formulating these continuous queries is important because it often is desirable to be able to filter a database based on the relationship of documents to each other, or based on the age of the records, or based on annotations that users may have attached to messages, etc.

SUMMARY OF THE INVENTION

In accordance with this invention, to produce a continuous query for an append-only database, a client defined query first is converted into its minimal bounding non-decreasing monotone (hereinafter referred to as "monotonic increasing" query. This monotonic query, in turn, is converted into an incremental query, The resulting monotonically increasing incremental query then is installed on the database as a stored procedure that takes two date/time parameters (hereinafter referred to as "time" parameters), one of which ($\tau$) identifies the last time the procedure was executed, and the other of which (t) identifies the current time. All database records are timestamped as of the time that they are entered into the database. Thus, in operation, more or less standard procedure calls are periodically invoked to call each of the stored query procedures, thereby periodically executing the incremental queries over database records that have timestamps spanning successive time slots.

BRIEF DESCRIPTION OF THE DRAWINGS

Still further features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to an illustrated embodiment, it is to be understood that there is no intent to limit it to that embodiment. On the contrary, the intent is to cover all modifications, alternatives and equivalents falling within the spirit and scope of the invention as defined by the appended claims.

I. Overview

Figure 1:
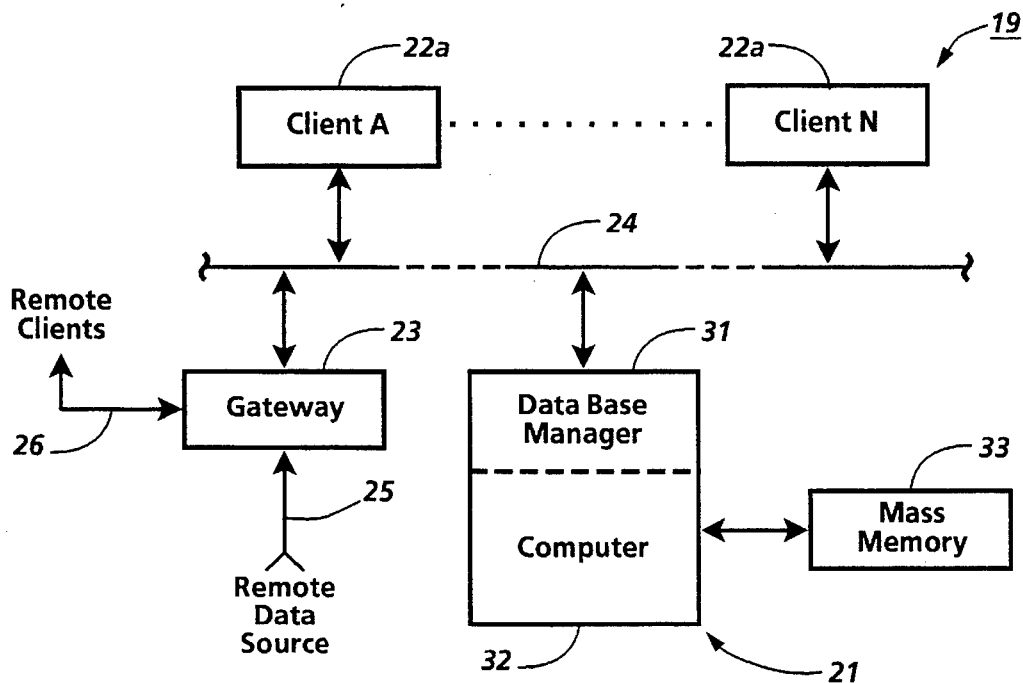
FIG. 1 is a simplified schematic diagram of a distributed computing environment having an append-only database that is suitable for filtering by the continuous query mechanism of this invention.

Turning now to the drawings, and at this point especially to FIG. 1, the present invention suitably is implemented in a generally standard distributed computing environment 19 having a dedicated or non-dedicated database server 21 that is linked to one or more nearby computers 22a–22n and to a gateway 23 by a local area network (LAN) 24. As shown, the computers 22a–22n (or their users) are "clients" for the database services that are offered by the server 21. However, they also may be data sources if, for example, the server 21 constructs a database from the electronic mail messages that are carried by the LAN 24. The gateway 23, in turn, links the LAN 24 to remote clients and/or data sources by dedicated and/or dial-up lines, as at 25 and 26, respectively. For instance, the server 21 might construct a database from a stream of news messages supplied by a remote source (not shown) that is coupled to the gateway 23 or to the server 21 by a dedicated communication channel.

In keeping with standard practices, the server 21 typically runs a generally conventional relational database manager 31 on an appropriate digital computer 32 that is equipped with a conventional mass memory 33.

Queries issued by the local clients 22a–22n and/or by the remote clients (not shown) are registered with the database manager 31, and the results of the searches that are performed in response to those queries are returned to the appropriate clients under the control of the database manager 31. One-time, ad hoc queries (i.e., those that are executed only once) are handled in accordance with the ordinary query handling mechanisms of the database manager 31, but continuous queries are stored by the database manager 31 as callable processes that can be periodically invoked.

II. Continuous Semantics

In accordance with this invention, it has been recognized that continuous semantics are required to prevent the return of nondeterministic results when a query is run periodically over an append-only database to which new records can be added over time. "Continuous semantics" exist if the result of a continuous query is the set of data that would be returned if the query were executed at every instant in time. Clearly, however, it is neither possible nor practical to run a query at every instant of time, so this invention implements an equivalent behavior for ensuring that the results that are returned to the client are well-defined and time-independent.

More particularly, if Q(t) is the set of records (i.e., the result) returned by the execution of a query Q over a database as it exists at every instant in time t, up until time t a fully equivalent result $Q_M(t)$ is obtained by executing the query Q as a "continuous" query and accumulating the results up until time t, such that $$Q_M(t) = \bigcup_{s \leq t} Q(s) \tag{1}$$

Thus, a query that is executed with continuous semantics returns $Q_M(t)$, not Q(t).

Equation (1) is valid for all monotone increasing queries (i.e., queries that are never matched or, if once matched by a database record, are then matched by that record in perpetuity). As discussed hereinbelow, some interesting queries are not inherently monotone, so they are converted into a "minimum bounding" monotone query $Q_M$, which is the smallest monotone query that returns all of the results of the query Q. A query $Q_M$ is monotone only if $Q_M(t_1) \subseteq Q_M(t_2)$ whenever $t_1 < t_2$.

Given a monotone query $Q_M$ as defined above, the key to executing the query efficiently is to convert the query into an incremental query $Q'$ that is parametrized by two times; the time $\tau$ that the query was last executed, and the current time t. As will be appreciated $Q'$ is only an approximation of $Q_M$ (t)$Q_M(\tau)$ but the loss of precision is outweighed by the increased computing efficiency. However, the incremental query $Q'$ always returns all new results and only occasionally returns prior results.

Figure 2:
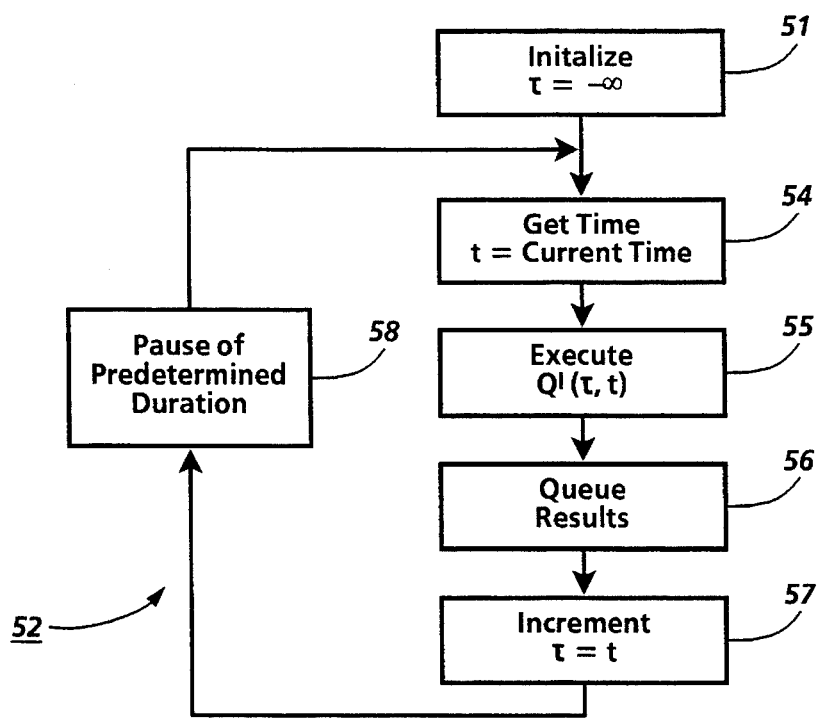
FIG. 2 is a simplified flow chart illustrating the execution of a continuous query.

Accordingly, as shown in FIG. 2, a continuous query is executed by initializing the $\tau$ start time parameter $\tau$ for the incremental monotone query $Q'$ to a value of $-\infty$ as at 51 and by then periodically looping through a routine 52. During this routine 52, the end time parameter t is set to the current time as at 54 and the incremental query $Q'(\tau, t)$ then is executed as at 55. Subsequently, the query results are queued for return to the client that owns the query as at 56, and the time parameter $\tau$ is incremented to the current time t as at 57. Thereafter, the routine 52 pauses for some predetermined period of time as at 58, prior to recycling through that same loop. A psuedo-code description of the process illustrated in FIG. 2 follows:

Set $\tau = -\infty$
FOREVER DO
    set t:=current time
    Execute query $Q'(\tau, t)$
    Return result to user
    set $\tau$:=t
    Sleep for some period of time
ENDLOOP III. Monotone Queries No query is monotone unless the database in which it is run is append-only. Within that constraint, however, many common SQL queries are monotone. For example, SQL queries that are merely boolean predicates over the column values of a single table are monotone. These monotone queries can include the comparison operators (=,<,>, ... ) and the boolean operators (AND, OR, and NOT). Queries involving joins also inherently are monotone if the tables that are joined are append-only.

There are, however, certain constructs that can result in non-monotone queries, including (1) functions that read the current time, and (2) subqueries prefaced by "NOT EXISTS". Such queries, therefore, are rewritten or otherwise converted into equivalent incremental minimum bounding monotone queries before they are loaded into the database system.

III. 1 Handling NOT EXISTS terms

To handle NOT EXISTS terms in the query, this invention allows terms of the form:

NOT EXISTS(
2 SELECT * FROM tbl1, tbl2, . . . , tbln WHERE R).

These new terms are equivalent to "for every" terms, since $\neg \exists x P(x)$ is the same as $\forall x \neg P(x)$.

However, complications arise if the subexpression R involves calls to GetDate(). Since calling GetDate() returns the current value of time t, R is written as R(t) to indicate that it depends on the current time. First, assume that the function R(t) is already monotone (this includes the case when R does not involve t -that is, does not contain- any GetDate() calls).

The NOT EXISTS subexpression shown above is true for the original query Q(t) if no records exist at time t that satisfy the R(t). As before, the rewrite rules need to add tbl.ts <t subexpressions to encode the fact that messages are not in the database until time t=tbl.ts:

NOT EXISTS
    SELECT * FROM tbl1, tbl2, . . . , tblk
    WHERE R(t) AND
    tbl1.ts<t AND tbl2.ts<t AND . . . AND tblk.ts<t).

This is equivalent to:

NOT EXISTS (
    SELECT * FROM tbl1, tbl2, . . . , tblk
    WHERE R(t) AND
    MAX(tbl1.ts, tbl2.ts, . . . , tblk.ts)<t).

As explained above, each disjunct can be handled separately, and each disjunct containing a NOT EXISTS subexpression will be in the form:

MAX($c_1, c_2, \ldots, c_n$)<t AND
MIN($d_1, d_2, \ldots, d_m$)>t AND P AND
NOT EXISTS (
    SELECT * FROM tbl1, tbl2, . . . , tblk
    WHERE
    R(t)AND MAX(tbl1.ts, tbl2.ts, . . . , tblk.ts)<t)

Because R(t) is monotone, any row that satisfies it can never cease to satisfy it as time goes on. Therefore, the NOT EXISTS subexpression can never go from FALSE to TRUE. Thus, it suffices to test R at the earliest time that the rest of the disjunct could become true; namely C=MAX($c_1, c_2, \ldots, c_n$). The subexpression then becomes:

C<t AND MIN($d_1, d_2, \ldots, d_m$)>t AND P AND
NOT EXISTS

SELECT * FROM tb11, tb12, . . . , tblk
WHERE
    R(C) AND MAX(tb11.ts, tb12.ts, . . . , tblk.ts)<C)

For example, tlz query "select messages more than 2 weeks old that no one has replied to" might be written in SQL as:

SELECT * FROM m
WHERE m.ts+2 weeks<t AND
NOT EXISTS
    SELECT * FROM m m1
    WHERE m1.inreplyto=m.msgid)

Adding the MAX subexpression gives:

SELECT * FROM m
WHERE m.ts+2 weeks<t AND
    NOT EXISTS(
        SELECT * FROM m m1
        WHERE m1.inreplyto=m.msgrld AND m1,ts<0

C=m.ts+2 weeks, so the monotone query is:
SELECT * FROM m
WHERE m.ts+2 weeks<t AND
    NOT EXISTS(
        SELECT * FROM m m1
        WHERE m1.inreplyto=m.msgid AND m1.ts<m.ts+2 weeks)

This says "select messages more than 2 weeks old that did not receive a reply in their first two weeks", which is exactly the smallest monotone query returning at least the messages of the original query.

Next, consider the most general case, where R(t) is not necessarily monotone, Unfortunately, R(t) cannot simply be converted to the minimal bounding monotone query and use the rules from above, as this would change the meaning of the query, For example, consider the query "select messages that have not received a reply for the last two weeks." This is:

SELECT m.msgid FROM m
WHERE NOT EXISTS(
    SELECT * FROM m m1
    WHERE m1.inreplyto=m.msgid AND t<m1.ts+2 weeks)

which means "select messages for which there does not exist a reply less than two weeks old." Making the subquery in the NOT EXISTS monotone produces a query that means "select messages for which thee does not exist a reply of any age," but this is not the same query.

Thus, monotonizing a NOT EXISTS with arbitrary R(t), requires finding a way to quantify over time, thereby mining NOT EXISTS( . . . t . . . ) into ∃ t NOT EXISTS(. . . t . . .). It is not possible to quantify over t in SQL, but it is possible to quantify over tbl.ts, More precisely, since R(t) is in standard form, t will occur in R in terms of the form t op c, where c is a function of fields from tb11, tb12, . . . To show this dependency, c is written as c(tb11,. . . , tblk). The set {$c_1$} of all values taken on by c over all the values in the database can be computed, Since the query has the same value for all t in an interval (c, c) of contiguous values of $c_i$, only one t needs to be checked per interval. So NOT EXISTS
    SELECT * FROM tb11, tb12, . . . , tblk
    WHERE R(t)AND MAX(tb11.ts, . . . , tblk.ts)<t)

has a monotone bound of

EXISTS(SELECT * FROM tb11 time1, . . . , tblk timek
WHERE c(time 1 , . . . , timek)<t AND
    NOT EXISTS(
        SELECT * FROM tb11, tb12, . . . , tblk
        WHERE R(c(timel, . . . , timek)) AND
            MAX(tb11,ts, tb12,ts, . . . tblk,ts)<c(timel, . . . timek)))

Returning to the example query "select messages that have not received a reply for the last two weeks", the addition of MAX(m1.ts, . . . , mkts)<t gives SELECT m.msgid FROM m
WHERE NOT EXISTS(
    SELECT * FROM m m1
    WHERE m1.inreplyto=m,msgid AND
        t<m1,ts+2 weeks AND m.ts<t AND m1,ts<t)

R(t) is m1.inreplyto=m.msgid AND t<m1.ts+2 weeks. Consequently, t op c has c =m2.ts+2 weeks. Thus the monotone query is:

SELECT * FROM m
WHERE EXISTS(
    SELECT * FROM m time
    WHERE time.ts+2 weeks<t AND
    NOT EXISTS(
        SELECT * FROM m m1
        WHERE m1.inreplyto=m.msgid AND
            time.ts+2 weeks<m1.ts+2 weeks AND
            m.ts<time.ts+2 weeks AND
            m1.ts<time,ts+2 weeks))

IV. Incremental Rewrite Rules

Focusing now in some additional detail on how to compute $Q^I(\tau, t)$ from $Q_M(t)$; it will be evident that it would be very inefficient to simply set $Q^I(\tau, t)=Q_M(t)$ AND (NOT $Q_M(\tau)$) since typically both $Q_M(t)$ and $Q_M(\tau)$ will involve searching the whole database, and will both return large sets of messages that are mostly identical. To Set a more efficient form for $Q^I(\tau, t)$ consider a very simple query such as "select messages from joe", which means just check the records that arrived in the interval $(\tau, t)$, namely:

SELECT * FROM m
WHERE m.from="joe" AND$\tau \leq$m.ts<t

This approach is applicable in general. The above-described rewriting rules always result in a $Q_M$ of the form $OR_i(P_i$ AND $c_i$<t), where $c_i$ is a MAX of constants. In the case that $Q_M$ has NOT EXISTS subexpressions, there may be NOT EXISTS inside the $P_i$, but the monotone rewrite will make it independent of t. Choosing $Q^I(\tau, t)=OR_i(P_i$ AND$\tau \leq c_i$<t) clearly satisfies $Q^I(\tau, t) \subseteq Q_M(t)$ since $Q^I$ is just $Q_M$ with an extra restriction. To confirm that $Q_M(\tau) - Q_M(\tau) \subseteq Q^I(\tau, t)$, it is observed that:

$Q_M(t) - Q_M(\tau) =$ $OR_i(P_i$ AND $c_i < t)$ AND NOT$(OR_j(P_j$ AND $c_j < \tau)) =$
$OR_i(P_i$ AND $c_i < t)$ AND AND$_j$(NOT $P_j$ OR $c_j \geq \tau) =$
$OR_j[(P_i$ AND $c_i < t)$ AND AND$_j$(NOT $P_j$ OR $c_j \geq \tau)] =$
$OR_i [(P_i$ AND $\tau \leq c_i < t)$ AND AND$_{j \neq i}$ (NOT $P_j$ OR $c \geq \tau)]$ This shows that $Q_M(t) - Q_M(\tau) \subseteq OR_i(P_i$ AND$\tau \leq c<t)=Q^i(\tau, t)$. Thus, this is the preferred choice for $Q^I(\tau, t)$, not only because it is sufficiently simple to run efficiently over the database (because of the $\tau \leq c_i$<t guard), but also because for most queries it is reasonably close to the "ideal" of $Q_M(t) - Q_M(\tau)$.

As an example of the above, consider the query "messages that received a reply." This might b written in SQL as:

SELECT m1.msgid FROM m m1, m m2
WHERE m2.inreplyto=m1.msgid

Adding MAX(m1.ts, m2.ts)<t and applying the above gives $Q'(\tau, t)$ as:

SELECT m1.msgid FROM m m1, m m2

WHERE m2.inreplyto=m1.msgid AND$\tau \leq$MAX(m1.ts, m2.ts)<t which expands out to:

SELECT m1.msgid FROM m m1, m m2

WHERE m2,inreplyto=m1,msgid AND
m1.ts<t AND m2,ts<AND ($\tau \leq$m1.ts OR$\tau \leq$m2,ts).

IV. The Architecture of an Implementation

Figure 3:
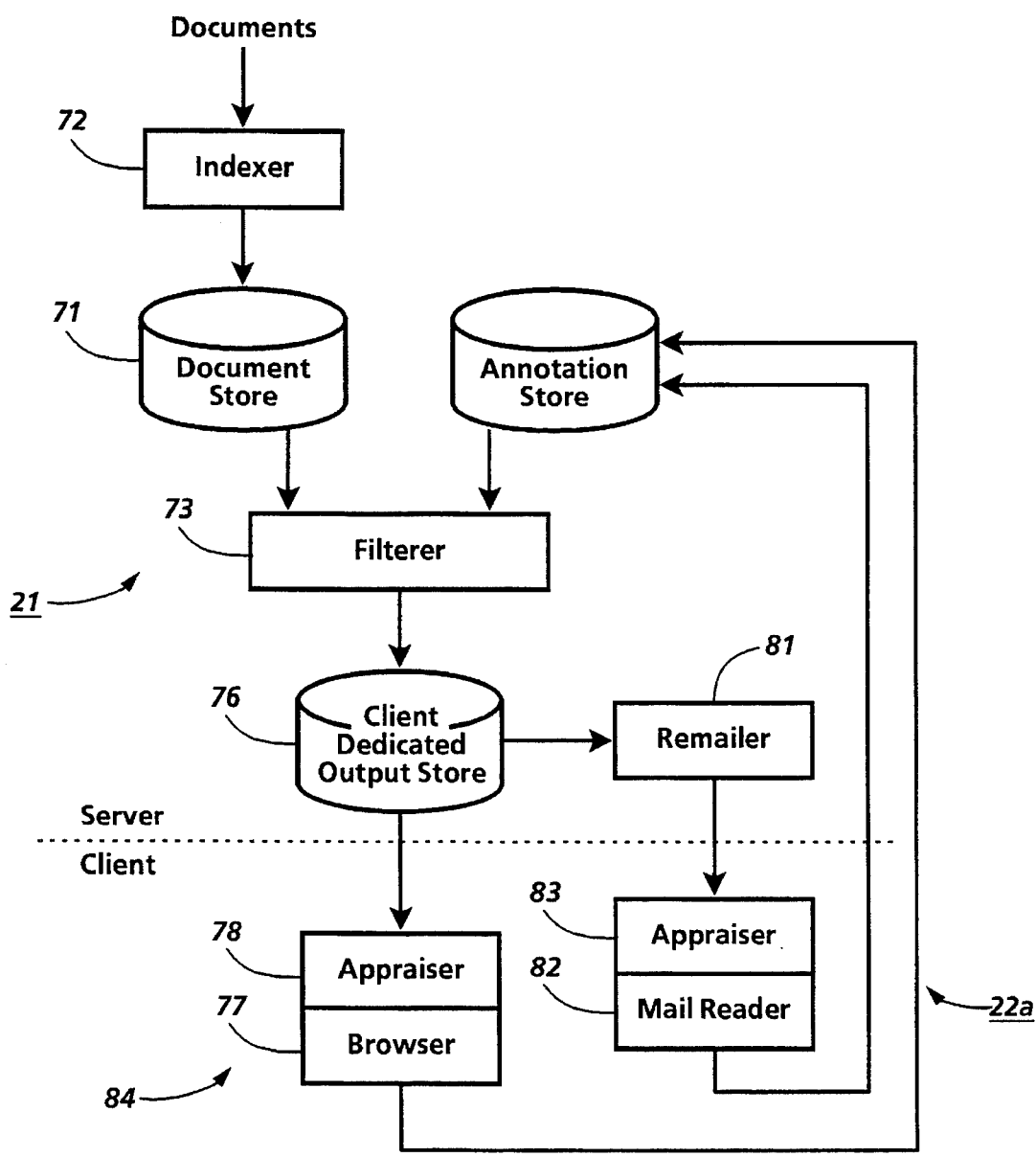
FIG. 3 is a simplified server/client model for a representative implementation of this invention.

FIG. 3 illustrates the flow of documents through the major components of a client/server model that is suitable for implementing this invention. In this particular implementation, documents, annotations and continuous "filter" queries are stored in a relational database system that is offered commercially by Sybase, Inc. under the name "Transact-SQL". It is to be understood, however, that the functional partitioning of the client/server model can be modified.

More particularly, as shown in FIG. 3, documents from local or remote external sources are loaded into an append-only document store 71 at the server by an indexer 72. The indexer 72 reads the incoming documents to parse them into a set of indexed fields that can be referenced in queries. A filterer 73 runs a batch of continuous queries over the documents that are stored in the document store 71 and/or the documents that are stored in an annotation store 74. These queries are substantively defined by, and are run on behalf of, the local and/or remote client or clients.

The results of the query or queries that are executed on behalf of any one client, such as the client 22a (FIG. 1) are loaded into an output store 76 that in dedicated to that particular client. The client may browse the results that are accumulated in this output store 76 through the use of a browser 77. Moreover, if desired, an appraiser 78 may be included for facilitating the browsing of the results by applying client specified classifications to them, such as to prioritize and/or categorize them. Alternatively, the client may retrieve the results of its queries by electronic mail through the use of remailer daemon 81 and a conventional mail reader 82. Again, an appraiser 83 may be employed to prioritize and categorize the results that are returned to the client by electronic mail.

The reader/browser 84 is the client interface to the database, so it is to be understood that it includes facilities for adding/deleting/editing continuous filter queries under the control of the client, retrieving and displaying query results (including documents that match the client defined queries), organizing the query matching documents into folders, returning client annotated documents to the annotation store 74, causing the database system to run ad hoc queries, and performing other client initiated interactions with the database. Suitably, these interactions are invoked by the client 22a by sending by mail documents to the server 21.

CONCLUSION

In view of the foregoing, it will be understood that the continuous query mechanism that is provided by this invention permits persistent filters to be implemented on append-only databases for extracting information that is of particular interest to any given client or set of clients from a more or less continuous stream of incoming data. The query mechanism that has been provided supports arbitrarily complex queries, including joins of multiple database tables, calls to read the current time, and existential subqueries. The continuous semantics of these queries causes the results to be well-specified and time-independent.

A variety of applications can benefit from the use of the continuous query mechanism of this invention. These queries may be used for many different purposes, including information filtering, data monitoring, and supplying active reminders. Indeed, many existing databases, such as those that store payroll data, billing information, stock market reports, reservations or reminder, are append-only and, therefore, are potential hosts for continuous queries.

What is claimed is:

1. A method for repetitively filtering an append-only database to find any database records that match user specified search queries, including any matching records that are appended to said database after said filtering has been initiated; said method comprising the steps of time stamping said records with respective running time values as the records are being appended to said database, whereby each of said database records has a time value that indicates when the record was appended to said database;

converting said user specified queries into respective incrementalized monotonic queries; and repetitively running said incrementalized monotonic queries over said database to identify records that match said monotonic queries during successive non-overlapping increments of time, including a first increment that covers back to before said database existed and a final increment that covers up to current time.

2. The method of claim 1 wherein each of said monotonic queries is bounded by recorded and current time parameters;

the recorded time parameter of each given one of said monotonic queries is initialized when the given monotonic query is first run to a time value predating all of said database records and is thereafter reset each time said given monotonic query is subsequently run to a time value indicating when the given monotonic query was last run; and the current time parameter of each given monotonic query is reset each time said given monotonic query is run to current time.

3. The method of claim 2 wherein

NOT EXIST expressions with arbitrary time dependent subexpressions are permissible elements of said user specified queries.

4. The method of any of claims 2 or 3 wherein said database is managed by a host computer.

5. The method of claim 4 wherein each of said monotonic queries is stored by said host computer as a stored procedure which takes a recorded time parameter and a current time parameter as variables.

* * * * *